(12) United States Patent
Duricic et al.

(10) Patent No.: US 8,121,483 B2
(45) Date of Patent: Feb. 21, 2012

(54) PACKAGING A RECONFIGURABLE OPTICAL ADD-DROP MODULE

(76) Inventors: Nenad Duricic, Ottawa (CA); Pierre D. Wall, Ottawa (CA)

( * ) Notice: Subject to any disclaimer, the term of this patent is extended or adjusted under 35 U.S.C. 154(b) by 585 days.

(21) Appl. No.: 12/328,913

(22) Filed: Dec. 5, 2008

(65) Prior Publication Data
US 2009/0214207 A1      Aug. 27, 2009

Related U.S. Application Data

(60) Provisional application No. 61/012,961, filed on Dec. 12, 2007.

(51) Int. Cl.
*H04J 14/02* (2006.01)
(52) U.S. Cl. ........... 398/83; 398/82; 398/84; 398/87; 398/164
(58) Field of Classification Search .......... 398/83, 398/84, 87, 68, 41, 42, 45, 164, 168; 385/37, 385/14–18
See application file for complete search history.

(56) References Cited

U.S. PATENT DOCUMENTS

| | | | | |
|---|---|---|---|---|
| 6,498,872 B2 * | 12/2002 | Bouevitch et al. | ........... | 385/24 |
| 6,597,481 B1 * | 7/2003 | Fatehi et al. | ........... | 398/82 |
| 6,707,959 B2 * | 3/2004 | Ducellier et al. | ........... | 385/17 |
| 6,718,084 B1 * | 4/2004 | Wang | ........... | 385/17 |
| 6,760,501 B2 * | 7/2004 | Iyer et al. | ........... | 385/16 |
| 6,810,169 B2 * | 10/2004 | Bouevitch | ........... | 385/24 |
| 6,882,800 B1 * | 4/2005 | Graves | ........... | 398/46 |
| 7,014,326 B2 * | 3/2006 | Danagher et al. | ........... | 359/615 |
| 7,046,411 B1 * | 5/2006 | Fleming | ........... | 359/224.1 |
| 7,330,617 B2 * | 2/2008 | Aota et al. | ........... | 385/18 |
| 7,340,128 B2 * | 3/2008 | Shibata et al. | ........... | 385/24 |
| 7,424,182 B2 * | 9/2008 | Matsuo et al. | ........... | 385/24 |
| 7,630,599 B2 * | 12/2009 | McLaughlin et al. | ........... | 385/18 |
| 7,738,748 B2 * | 6/2010 | Strasser et al. | ........... | 385/17 |
| 8,036,502 B2 * | 10/2011 | Duricic et al. | ........... | 385/16 |
| 2002/0097952 A1 | 7/2002 | Jin et al. | ........... | 385/18 |

(Continued)

FOREIGN PATENT DOCUMENTS

WO     WO 02/37726     5/2002

(Continued)

OTHER PUBLICATIONS

EP Search Report, EP application No. 08170526.1, Dec. 2, 2008.

(Continued)

*Primary Examiner* — Kenneth N Vanderpuye
*Assistant Examiner* — Hibret Woldekidan
(74) *Attorney, Agent, or Firm* — Teitelbaum & MacLean; Neil Teitelbaum; Doug MacLean

(57) ABSTRACT

A hermetically packaged, MEMS array-based ROADM module is disclosed. The enclosure sidewalls and a top lid are made of Kovar, and the base is made of alumina ceramic AuSn-soldered to the enclosure sidewalls. The MEMS array is attached to the ceramic base. The optics are passively pre-aligned using a removable template and epoxied to an optical bench. The optical bench is actively aligned as a whole and attached to the ceramic base. A plurality of electrical feedthrough contact pins extend from the bottom of the ceramic base for connecting the MEMS to a connector on a printed circuit board. In one embodiment of the invention, the ceramic base extends beyond the footprint of the sidewalls of the enclosure of the module, for mounting additional electronic components, for example MEMS driver circuitry chips, directly to the ceramic base of the enclosure.

20 Claims, 8 Drawing Sheets

U.S. PATENT DOCUMENTS

| | | |
|---|---|---|
| 2003/0011769 A1 | 1/2003 | Rakuljic et al. ............... 356/328 |
| 2003/0030793 A1 | 2/2003 | Bastue et al. ................. 356/153 |
| 2003/0057508 A1* | 3/2003 | Bendelli et al. ............... 257/433 |
| 2003/0095307 A1* | 5/2003 | Moon et al. ................... 359/117 |
| 2004/0156581 A1* | 8/2004 | Golub et al. .................... 385/18 |
| 2004/0165813 A1* | 8/2004 | Kouns ............................ 385/16 |
| 2005/0263878 A1* | 12/2005 | Potter ........................... 257/704 |
| 2007/0242953 A1* | 10/2007 | Keyworth et al. .............. 398/48 |
| 2007/0264749 A1* | 11/2007 | Birkmeyer .................... 438/106 |
| 2008/0131130 A1* | 6/2008 | Chang et al. .................... 398/83 |
| 2009/0286382 A1* | 11/2009 | Huff .............................. 438/455 |

FOREIGN PATENT DOCUMENTS

WO     WO 03/019259     3/2003

OTHER PUBLICATIONS

Bouevitch et al., "Channel-Power Equalizer and Dynamic Gain Equalizer based on the Optical bench Platform", LEOS Summer Topical Meetings 2002, p. MD1.

* cited by examiner

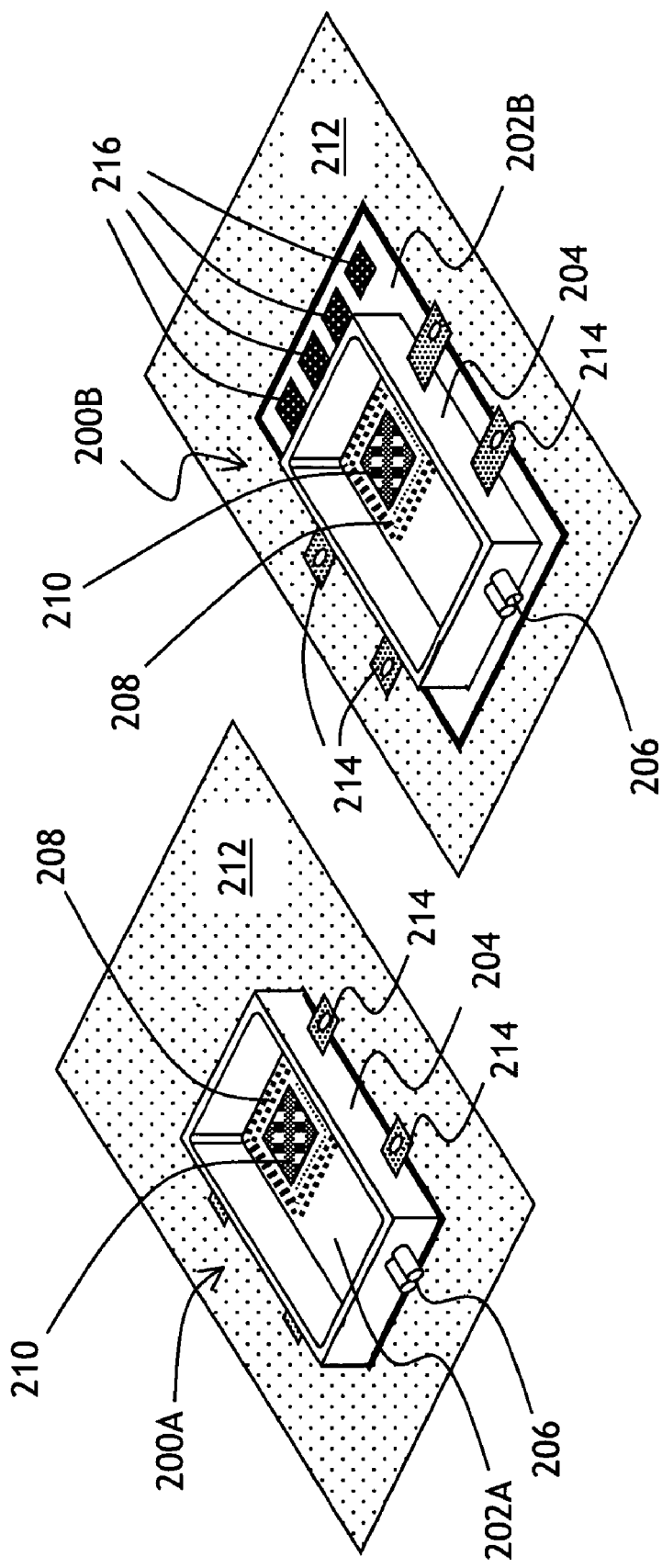

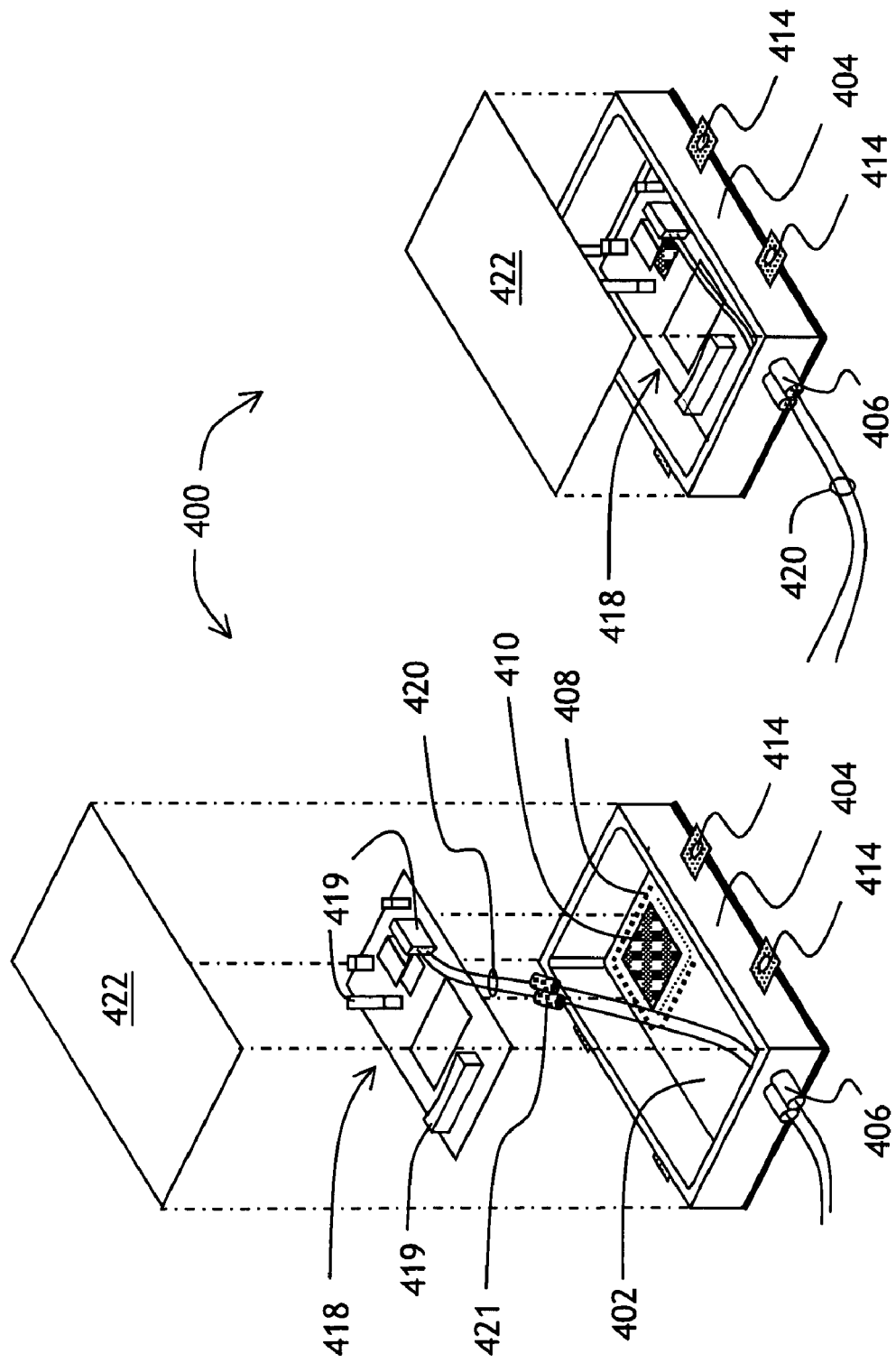

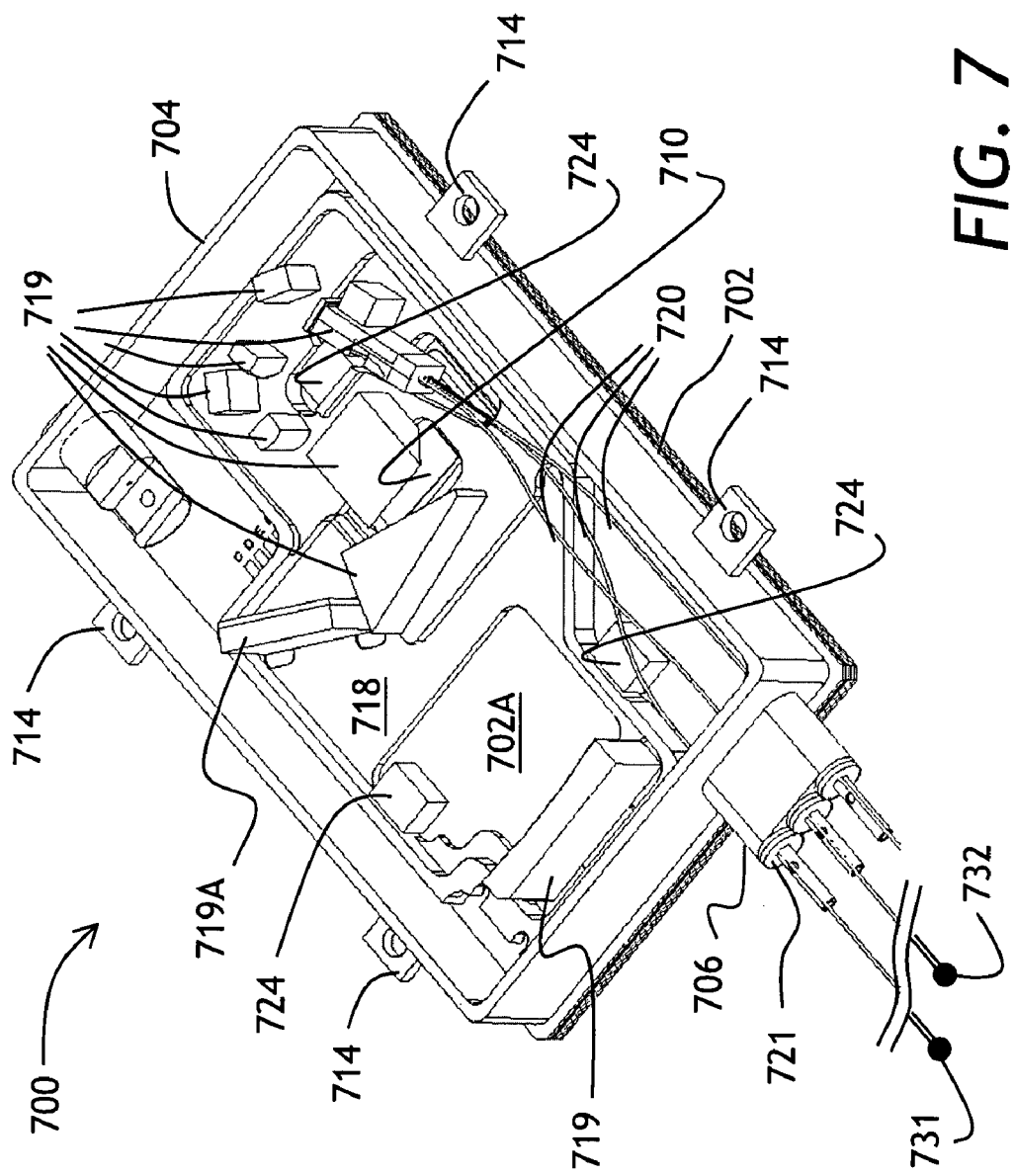

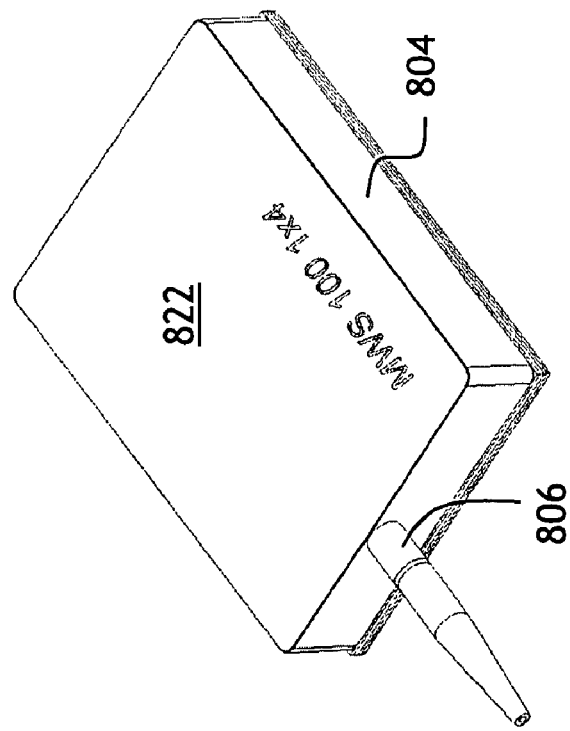
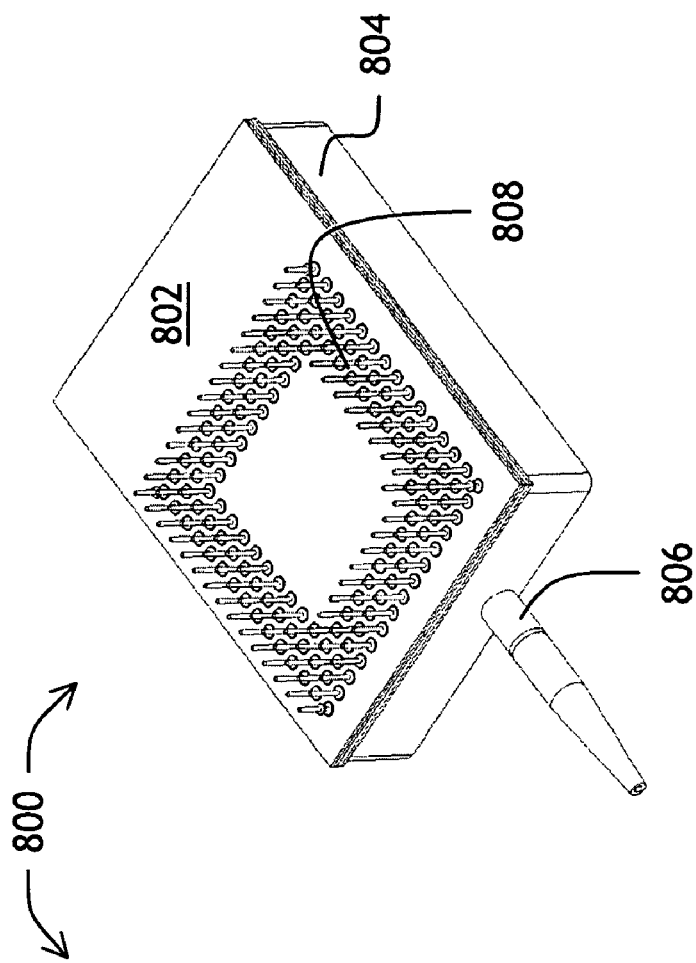
FIG. 8A
FIG. 8B

PACKAGING A RECONFIGURABLE OPTICAL ADD-DROP MODULE

CROSS-REFERENCE TO RELATED APPLICATIONS

The present invention claims priority from U.S. Provisional Application No. 61/012,961, filed Dec. 12, 2007, which is incorporated herein by reference.

TECHNICAL FIELD

The present invention is related to optical cross-connect modules for optical communications networks, and in particular to packaging of optical cross-connect modules such as reconfigurable optical add-drop modules.

BACKGROUND OF THE INVENTION

In an optical communication network, optical signals having a plurality of optical channels at individual wavelengths, called "wavelength channels", are transmitted from one location to another, typically through a length of an optical fiber. An optical cross-connect module allows switching of optical signals from one optical fiber to another. A wavelength-selective optical cross-connect, or a reconfigurable optical add-drop module (ROADM), allows wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. An optical network architecture based on wavelength-selective optical switching, which is sometimes called an "agile" optical network architecture, has many attractive features due to its ability to automatically create or re-route optical paths of individual wavelength channels. It accelerates service deployment, accelerates rerouting around points of failure of an optical network, reduces capital and operating expenses for a service provider, as well as creates a future-proof topology of the network.

Of many ROADM architectures presently available, an architecture based on free-space optics and a micro-electromechanical system (MEMS) array or a liquid crystal (LC) array is one of the most versatile and high-performance architectures. In particular, a folded symmetrical 4-f configuration taught in U.S. Pat. No. 6,498,872 by Bouevitch et al., with an optional field-flattening optical wedge taught in U.S. Pat. No. 6,760,501 by Iyer et al., both assigned to JDS Uniphase Corporation and incorporated herein by reference, allow construction of ROADMs such as a dynamic gain equalizer module for equalizing optical power values of individual wavelength channels, a wavelength blocker module for completely blocking any subset of a full set of the wavelength channels, and a wavelength selective optical switch module for performing the abovementioned wavelength channel switching function. Among the ROADMs based on the folded 4-f configuration are: a wavelength blocker module taught in U.S. Pat. No. 7,014,326 by Danagher et al. and a multiport wavelength selective switch modules taught in U.S. Pat. Nos. 6,707,959 by Ducellier et al. and 6,810,169 by Bouevitch, both assigned to JDS Uniphase Corporation and incorporated herein by reference; and a multi-module units taught in US Patent application publication 20070242953 by Keyworth et al., incorporated herein by reference. Advantageously, the folded 4-f ROADMs have a reduced number of optical elements and reduced physical size, as compared to other existing free-space ROADM optical configurations of similar functionality. More details on optical principle of operation of the folded 4-f ROADMs can be found in the abovementioned US patent documents.

ROADMs are generally deployed at various nodes of an optical network and, therefore, they must perform reliably in harsh environments characterized by a wide range of temperature and humidity, which typically requires using a hermetic enclosure to package a ROADM. Hermetic enclosures are known. They are frequently used to package small optoelectronic and electro-optic devices such as photodiodes and optical power monitors, laser diodes, or receivers, most of which have a maximum outer dimension of half an inch or smaller. A small ceramic substrate is sometimes implemented in devices requiring a good radio-frequency (RF) electrical performance. However, these methods of hermetic packaging are not practical for a ROADM because of comparatively large optics footprint of approximately one square inch or more, and a large number of electrical feedthroughs required, from about fifty to a few hundred feedthroughs.

Due to a relatively large footprint of optics, and due to a large number of electrical connections to a MEMS or an LC optical switching engine as explained above, mechanical packaging of a ROADM represents a considerable technical challenge. As noted above, a hermetically sealed enclosure box is generally implemented to ensure the required degree of environmental stability and reliability. A flexible printed circuit board (flex-PCB) is used in the prior art to provide required electrical connections within the hermetic enclosure, while mechanically de-coupling the switching engine from an internal multi-pin hermetic electrical connector mounted on a wall of the box. It takes a long time and considerable operator skill and effort to fit all the fiber feedthroughs, flex-PCBs, and to fit and align the optical elements inside the package, which increases the cost of the assembly and reduces manufacturing yields due to an increased possibility of an accidental damage to a fiber, an optic, or a switching engine. Furthermore, a ROADM package built using this existing technology has a relatively large footprint since both the optics, the flex-PCB, and the multi-pin hermetic connector need to be accommodated inside the package. The large size of a ROADM package is highly detrimental because telecom system providers are strongly motivated to increase the element density of their circuit cards, to facilitate a decrease in the system size and cost.

It is therefore the goal of the present invention to provide a ROADM that is free from the drawbacks of a large package size, considerable complexity of assembly, lowered assembly yields, and a comparatively long assembly time.

The present invention meets the above stated goal; furthermore, advantageously and unexpectedly, it greatly improves versatility and modularity of ROADM packaging and enables a straightforward on-board ROADM electronics integration, which considerably simplifies subsequent utilization of a ROADM in an agile optical network system.

SUMMARY OF THE INVENTION

In accordance with the invention there is provided a reconfigurable optical add-drop module comprising:

an input optical port for launching an input optical signal having a plurality of wavelength channels;

an output optical port for outputting an output optical signal having at least one of said wavelength channels;

a dispersive optical element optically coupled to the input optical port and to the output optical port, for spatially dispersing the input optical signal into individual wavelength channels, and for recombining the at least one wavelength channel into the output optical signal;

an optical switching engine optically coupled to the dispersive optical element, for spatially redirecting the individual wavelength channels;

a plurality of optical components for providing optical coupling of the dispersive element to the input optical port, to the output optical port, and to the optical switching engine;

an optical bench for supporting the dispersive optical element and the plurality of optical components in a fixed relationship therebetween; and an enclosure for packaging the optical switching engine and the optical bench having the optical elements mounted thereon, the enclosure having: a base for supporting the optical bench and the optical switching engine, a closed sidewall attached to the base, wherein the sidewall surrounds the optical bench and the optical switching engine, and a lid attached to the sidewall, for sealing the enclosure;

wherein at least a portion of the base comprises a ceramic board for supporting the optical switching engine, wherein at least a portion of said ceramic board is mechanically accessible from both inside and outside of the enclosure, wherein said portion of ceramic board has electrical feedthroughs coupled to said optical switching engine, and wherein said feedthroughs are mechanically and electrically accessible from the outside of the enclosure.

In accordance with another aspect of the invention there is further provided a method of assembly of the reconfigurable optical add-drop module, comprising:

(a) aligning the optical elements and the dispersive optical element to the optical bench;

(b) upon completion of step (a), fixing said optical and dispersive optical elements to the optical bench;

(c) attaching the base to the sidewall;

(d) attaching the optical switching engine to the ceramic board, and electrically coupling said optical switching engine to the feedthroughs in the ceramic board;

(e) upon completion of steps (b) and (d), aligning the optical bench to the optical switching engine, so as to provide the optical coupling between the optical switching engine on the ceramic board and the dispersive element on the optical bench;

(f) upon completion of step (e), attaching the optical bench to the base; and (g) upon completion of step (f), attaching the lid and the sidewall, so as to seal the enclosure.

BRIEF DESCRIPTION OF THE DRAWINGS

Exemplary embodiments will now be described in conjunction with the drawings in which:

FIGS. 2A and 2B are three-dimensional views of two embodiments of a ROADM enclosure according to the present invention;

FIGS. 4A and 4B are three-dimensional views illustrating a process of assembly of a ROADM module according to the present invention, FIG. 4A being the exploded view of the ROADM module and FIG. 4B being the assembled view of the ROADM module with a lid elevated;

FIG. 7 is a three-dimensional view of a packaged MWS without a lid; and

FIGS. 8A and 8B are three-dimensional views of a packaged 1-input, 4-output MWS for 100 GHz optical channel frequency spacing.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In forthcoming FIGS. 2A, 2B to 8A, 8B, like numerals refer to like elements.

Figure 1B:
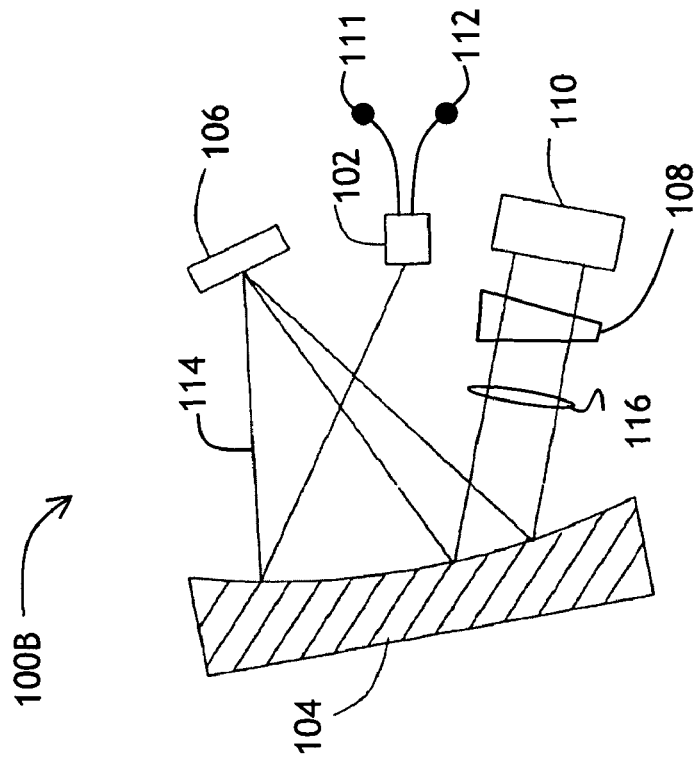
FIGS. 1A and 1B are prior-art generic 4-f folded symmetrical optical configurations for a reconfigurable optical add-drop multiplexer (ROADM)
Figure 1A:
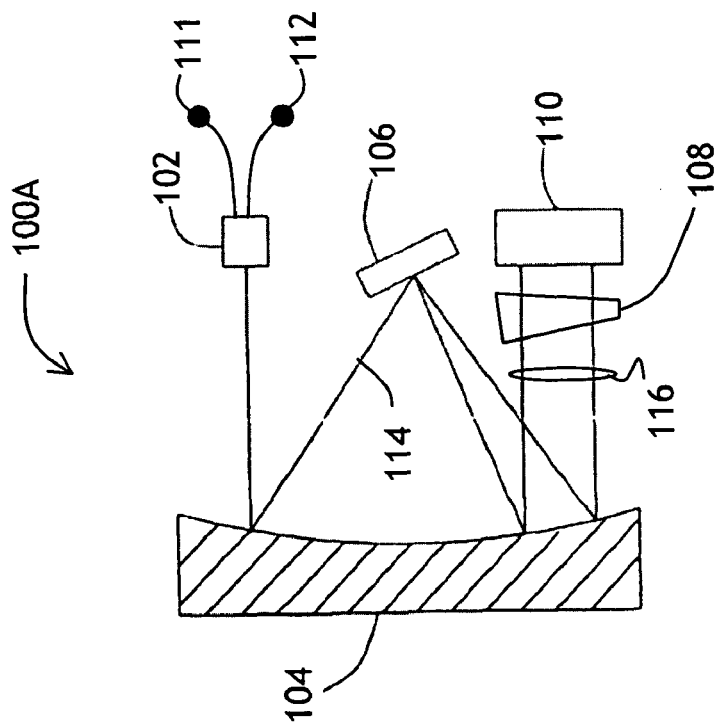

Referring to FIGS. 1A and 1B, prior-art optical configurations for reconfigurable optical add-drop multiplexers (ROADMs) 100A and 100B are shown, respectively. The optical elements of the ROADMs 100A and 100B are: a front end 102 for launching and receiving free-space optical beams having a plurality of wavelength channels, a concave mirror 104 for focusing and collimating optical beams, a dispersive element 106 for spatially dispersing an input optical beam into the wavelength channels, and for combining the wavelength channels into an output optical beam, a field-flattening wedge 108 for improving optical insertion loss of the ROADMs 100a and 100B, and an optical switching engine 110 for selectively switching individual wavelength channels from an input optical port 111 to an output optical port 112, wherein both said ports are optically coupled to the front end 102. FIGS. 1A and 1B show two possible relative positions of the elements 102 to 110. The dispersive element 106 is preferably a diffraction grating. The optical switching engine 110 is preferably a micro-electro-mechanical system (MEMS) micromirrors array or a liquid crystal (LC) array.

In operation, an input optical signal is launched into the input optical port 111 of the front end 102 optically coupled by the concave mirror 104 to the dispersive element 106, which disperses an incoming optical beam 114 into individual wavelength channels 116. The concave mirror 104 couples the wavelength channels 116 to the optical switching engine 110, which spatially redirects the wavelength channels 116. Upon reflecting from the optical switching engine 110, the channels, or the beams 116 are collimated by the mirror 104, recombined by the dispersive element 106, and focused by the mirror 104 back into the front end 102 coupled to the output optical port 112. Depending upon the state of individual pixels, not shown, of the optical switching engine 110, the individual wavelength channels may be attenuated, switched to the output port 112, or suppressed by at least 35 dB. The footprint of the optical arrangement of FIGS. 1A and 1B for a 100 GHz channel spacing is approximately 2×3 inches. A detailed description of operation of the ROADM optics shown in FIGS. 1A and 1B can be found in the above-mentioned US patent documents.

Referring now to FIGS. 2A and 2B, ROADM enclosures 200A and 200B of the present invention are shown including bases 202A and 202B, respectively, a closed sidewall 204, and fiber feedthroughs 206. The bases 202A and 202B are ceramic boards having connector pins 208 extending, in the downward direction in FIGS. 2A and 2B, from the bases 202A and 202B. In FIG. 2A, a MEMS array 210 is attached directly to the base 202A at a location between the connector pins 208. The MEMS array 210 is wirebonded to bond pads, not shown, that are in an electrical contact with the pins 208. The ROADM enclosure 200A is mounted on an external system board 212 having a connector socket disposed underneath the base 202A. The system board 212 is not a part of the enclosure 200A. The board connector socket, not shown, has a pin pattern that matches the pattern of the pins 208. Once the enclosure 200A is mounted on the board 212, the electrical connections between the enclosure 200A and the board 212 are established. Alternatively, the pins 208 can be soldered directly to the system board 212 having a matching hole and, or soldering pad pattern using, for example, a solder ball grid array. Tabs 214 soldered or brazed to the sidewall 204 are preferably used to secure the enclosure 200A on the board 212. In the enclosure 200A of FIG. 2A, the base 202A has substantially the same footprint as the sidewall 204, while the enclosure 200B shown in FIG. 2B has a larger footprint than a footprint of the sidewall 204, which allows additional electronic components 216, e.g. driver circuitry for the MEMS array 210, to be placed on the base 202B. Thus, the components 216 can include a raw electronic chip, or die, wirebonded directly to the base 202B.

All the other features of the enclosures 200A and 200B shown in FIGS. 2A and 2B, e.g. the MEMS array 210 wirebonded to the bond pads, are substantially the same. Preferably, the sidewall 204 is made of Kovar™, and the bases 202A and 202B are made of alumina ceramic matching the coefficient of thermal expansion (CTE) of Kovar. The sidewall 204 and the base 202A of FIG. 2A or 202B of FIG. 2B are attached together by soldering, preferably with an AuSn alloy at a temperature of 280+−40 C, to avoid cracking of the ceramic bases 202A and 202B. Further, preferably, the ceramic bases 202A and 202B have a frame of gold coating matching the perimeter of the sidewall 204, so that the latter can be brazed or soldered to the gold frame, not shown.

Figure 3D:
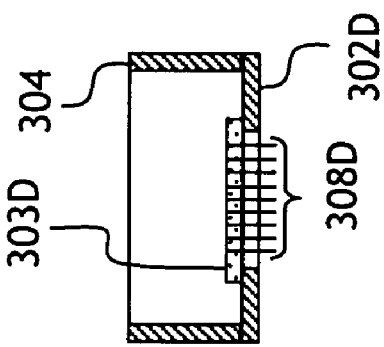
FIGS. 3A to 3D are cross-sectional views of four embodiments of a ROADM enclosure according to the present invention.
Figure 3C:
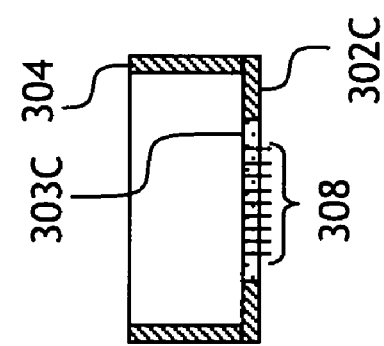
Figure 3B:
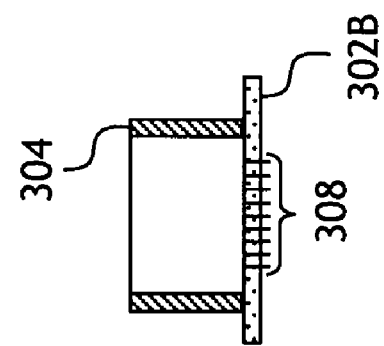
Figure 3A:
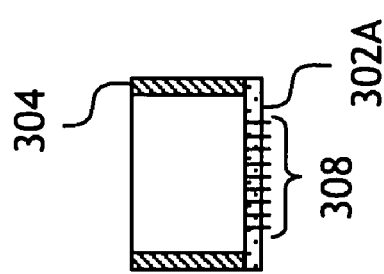

Turning now to FIGS. 3A to 3D, cross-sectional views of four embodiments of a ROADM enclosure according to the present invention are shown. The cross-sectional view of FIG. 3A corresponds to the three-dimensional view of FIG. 2A. In the embodiment of FIG. 3A, the footprints of a sidewall 304 and a base 302A are substantially the same. The base 302A is made of alumina ceramic, with pins 308 extending down from the base 302A, the pins 308 being electrically accessible from the both sides of the base 302A as shown. In the embodiment of FIG. 3B, the footprint of the sidewall 304 is smaller than that of a base 302B made of alumina ceramic, with pins 308 extending down from the base 302B, the pins 308 being electrically accessible from the both sides of the base 302B. As has been explained above, a larger footprint of the base 302B can be advantageously used for mounting of additional electronic components, not shown in FIG. 3B, onto the ceramic base 302B. Turning now to FIG. 3C, a base 302C has a ceramic insert 303C, with pins 308 extending down from the base 302C, the pins 308 being electrically accessible from the both sides of the insert 303C. The ceramic insert 303C runs through the entire thickness of the base 302C. Preferably, the insert 303C and the base 302C are attached flash with respect to each other, that is, the lower surfaces of the base 302C and of the insert 303C in FIG. 3C run at the same level. Finally, in FIG. 3D, a base 302D has an opening and a ceramic insert 303D covering that opening, with pins 308D extending down from the base 302D into the opening, the pins 308 being electrically accessible from the top side of the insert 303D. Furthermore, the pins 308D are mechanically and electrically accessible from an outside of the enclosure shown in FIG. 3D. In this context, the term "electrically accessible pins" means that an electrical contact may be established with the pins, preferably by means of electrical traces printed on the ceramic bases 302A and 302B and the ceramic inserts 303C and 303D, from the top side of said ceramic bases and inserts. Further, preferably, the bases 302A an 302B and the inserts 303C and 303D are multi-layer ceramic boards having conductive traces printed on some of the layers of the ceramic boards, said traces electrically connecting the pins 308 to wirebonding pads, not shown in FIGS. 3A to 3D, wherein said pads are accessible from the top side of said ceramic boards in FIGS. 3A to 3D.

The enclosures of FIGS. 3C and 3D can be used for packaging of optics having a larger footprint than a footprint of the optics of the enclosures of FIGS. 3A and 3B, so that the entire base 302C or 302D does not have to be made out of a ceramic, which is usually a brittle material. Preferably, the sidewall 304 in FIGS. 3A to 3D and the bases 302C and 302D in FIGS. 3C and 3D, respectively, are made out of Kovar. Further, preferably, ceramic and Kovar parts in FIGS. 3A to 3D are attached to each other by soldering with an AuSn alloy at a temperature of 280+−40 C, to avoid cracking of the alumina. A gold frame mentioned above is preferably used to facilitate the soldering process.

Referring now to FIGS. 4A and 4B, a process of assembly of a ROADM according to the present invention is illustrated. In FIG. 4A, an exploded view of a ROADM assembly 400 is shown. The assembly 400 has a ceramic base 402, a sidewall 404, fiber feedthroughs 406, an optical switching engine 410 such as a MEMS or an LC array, attachment tabs 414, an optical bench 418 for holding optical elements 419 thereon, input and output fibers 420 with cerrocasts 421 for sealing the fibers 420 and fitting into the feedthroughs 406, and a top lid 422 for sealing the package 400. The optical elements 419 are pre-aligned and attached to the bench 418 using a template, not shown, for defining the positions of the optical elements 419 relative to each other and to the bench 418. The aligning is performed by affixing the template to the optical bench and by placing the optical elements and the dispersive optical element into the template. Then, the optical elements 419 are attached, preferably epoxied, to the bench 418. The optical elements 419 include the elements shown in FIGS. 1A and 1B, that is a diffraction grating, a spherical mirror, a front end, as well as other optical elements such as turning and folding mirrors. Other attachment methods, such as glass soldering, can be used to affix the optical elements 419 to the optical bench 418.

The sidewall 404 and the ceramic base 402 are soldered together with an AuSn alloy at 280+−40 C. Then, the optical switching engine 410 is epoxied to the base 402 and is wirebonded to bonding pads, not shown, electrically connected to downward extending pins 408 brazed to the base 402. Then, the optical bench 418 having the optical elements 419 attached thereto is actively aligned to the optical switching engine 410. During the active alignment step, the optical bench 418 is brought to the optical switching engine 410 using a translation and, or a rotation stage, not shown; an input optical signal, i.e. a test input signal, is launched into an input fiber of the fibers 420; and an output optical signal, i.e. a test output signal, is detected at an output fiber of the fibers 420, while the position of the optical bench 418 is adjusted relative to the optical switching engine 410, so as to achieve a pre-defined optical power level of the test output signal. After a target optical power level is achieved, the optical bench 418 is permanently attached to the base 402, with the sidewall 404 surrounding the bench 418 as shown in FIG. 4B. Then, the top lid 422 is soldered or, preferably, resistance- or laser-welded to the sidewall 404, so as to hermetically seal the assembly 400. In this context, the term "hermetically seal" means sealing as per an industry standard known as MIL-STD 883D method 1014.9, or a similar standard.

A nitrogen or an argon gas purging is advantageously used before the hermetic sealing is completed. The sidewall 404 is preferably made of Kovar, and the base 402 is preferably made of alumina. The TCEs of the alumina base 402 and the sidewall 404 are preferably matched to each other to within 1-1.5 ppm (parts per million) per degree Celsius, so as to avoid cracking of the base 402. A metallization layer for base to wall attachment, not shown, is printed on the alumina base 402 prior to alumina co-firing using tungsten or molybdenum-manganese and then is Ni/Au plated to facilitate the subsequent soldering of the base 402 to the sidewall 404.

Figure 5:
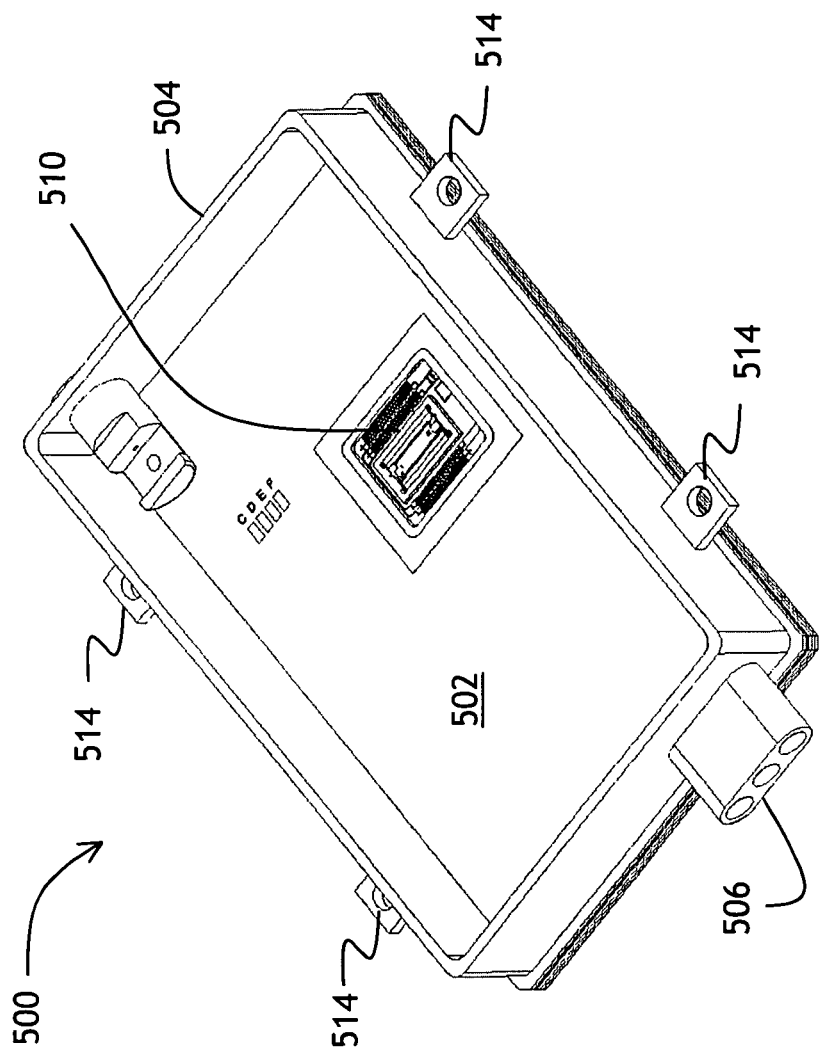
FIG. 5 is a three-dimensional view of a package of a multiport wavelength switch (MWS) according to the present invention.

Referring now to FIG. 5, a three-dimensional view of a package 500 of a multiport wavelength switch (MWS) according to the present invention is shown. The package 500 has a multi-layer ceramic base 502, a sidewall 504 soldered to the base 502, fiber feedthroughs 506 and tabs 514 brazed to the sidewall 504, and a MEMS array 510 epoxied to the base 502. The MEMS array 510 is wirebonded to tabs, not shown, that are electrically coupled to feedthrough pins, not shown in FIG. 5, accessible from outside of the package 500. Said electric coupling is preferably realized by using conductive traces suitably printed on individual layer or layers of the multi-layer ceramic base 502, so as to electrically couple the pins to the pads. The pins are preferably brazed to the base 502.

Figure 6:
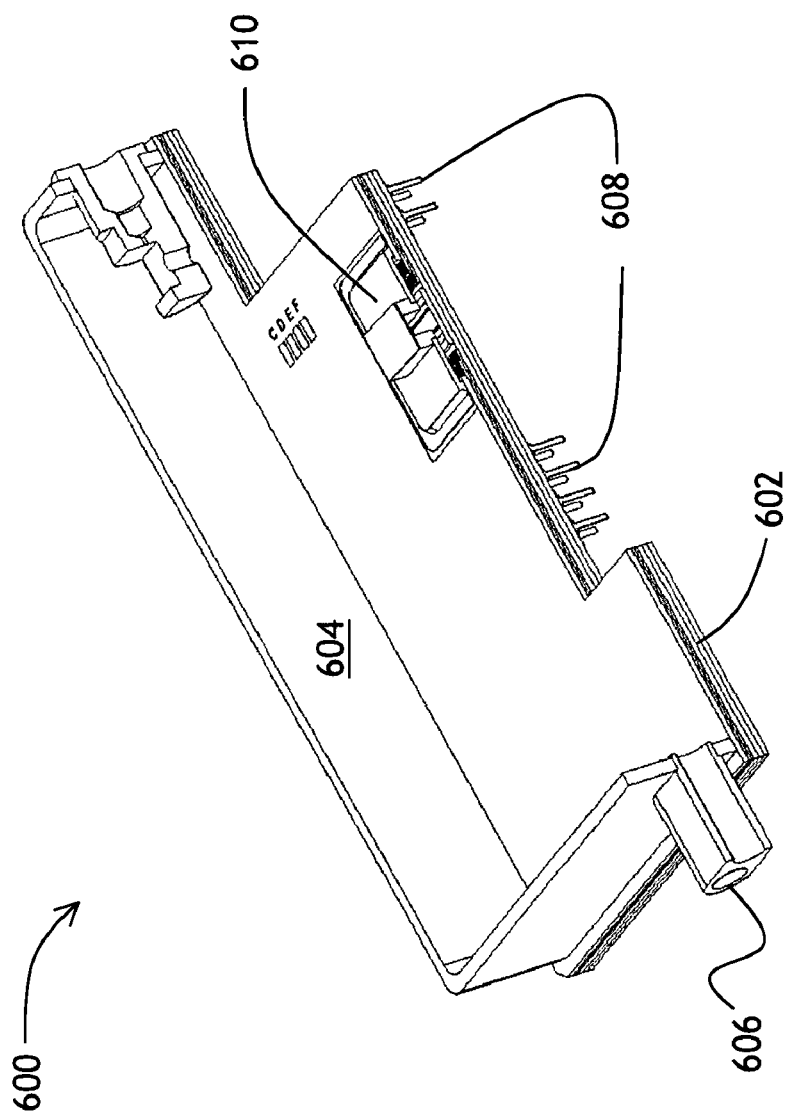
FIG. 6 is a three-dimensional cross-sectional view of the package of FIG. 5.

Referring now to FIG. 6, a three-dimensional cross-sectional view of a package 600, corresponding to the package 500 of FIG. 5, is shown including a multilayer ceramic base 602, a sidewall 604 soldered to the base 602, fiber feedthroughs 606 brazed to the sidewall 504, pins 608 running through a portion of the thickness of the multi-layer base 602, and a MEMS array 610 epoxied to the base 602.

Turning now to FIG. 7, a three-dimensional view of a multiport wavelength switch module 700 according to the present invention is shown including a multi-layer ceramic base 702, a sidewall 704 soldered to the base 702, fiber feedthroughs 706 and tabs 714 brazed to the sidewall 704, a MEMS array 710 epoxied to the base 702, an optical bench 718 having optical components 719 and a diffraction grating 719A attached thereto, three optical fibers 720 having cerrocasts 721 for insertion into and hermetic sealing the fiber feedthroughs 706, and three glass posts 724 for attaching the optical bench 718 to the base 702. In operation, one of the fibers 720 is used as an input fiber for launching an input optical signal having a plurality of wavelength channels from an input port 731 and another fiber of the fibers 720 is used as an output fiber for outputting an output optical signal having at least one of said wavelength channels to an output port 732. The diffraction grating 719A is used as a dispersive optical element for spatially dispersing the input optical signal into individual wavelength channels, and for recombining the at least one wavelength channel into the output optical signal. The optical elements 719 are used to optically couple the diffraction grating 719A to the input port 731, to the output port 732, and to the MEMS array 710, which is used as an optical switching engine for spatially redirecting the individual wavelength channels, so as to make desired wavelength channels couple into the output port 732. The function of the optical bench 718 is to support the diffraction grating 719A and the optical components 719 in a fixed relationship therebetween, so as to ensure said optical coupling of the diffraction grating 719A to the input port 731, to the output port 732, and to the MEMS array 710. More details on operation of the optics can be found in the abovementioned US patent documents.

During the alignment of the optical bench 718 to the MEMS array 710, the optical bench is translated and, or tilted so that, preferably, flat surfaces of the posts 724 can sustain a flash contact both with a flat surface of the bench 718 and a surface 702A of the base 702. During subsequent epoxying of the optical bench 718 to the posts 724, and of the posts 724 to the surface 702A, the epoxy gaps are substantially uniform, so that a high degree of mechanical stability is achieved.

A number of modifications of the optical cross-connect package constructions presented herein are possible. For example, ceramic posts can be used instead of glass posts such as the posts 724 of FIG. 7, two or four posts can be used instead of three posts, or a grism may be used instead of the diffraction grating 719A.

Turning now to FIGS. 8A and 8B, a top and a bottom view of a one-input, four-output packaged MWS module 800 is shown, respectively. The module 800 has a ceramic base 802, pins 808 extending outwards from the base 802, wherein the pins 808 are electrically coupled to an optical switching engine, not shown since it is located inside the module 800, a fiber feedthrough 806 attached to a closed sidewall 804, and a top lid 822 welded to the side wall 804. The size of the ceramic base 802 is only 56 mm by 79 mm. The module 800 is small enough so as to allow a secure attachment to an outside circuit board, not shown, by soldering the pins 808 directly to the outside board. Thus, integration of the module 800 into a wavelength-agile optical network system is significantly simplified.

What is claimed is:

1. A reconfigurable optical add-drop module comprising:
an input optical port for launching an input optical signal having a plurality of wavelength channels;
an output optical port for outputting an output optical signal having at least one of said wavelength channels;
a dispersive optical element optically coupled to the input optical port and to the output optical port, for spatially dispersing the input optical signal into individual wavelength channels, and for recombining the at least one wavelength channel into the output optical signal;
an optical switching engine optically coupled to the dispersive optical element, for spatially redirecting the at least one wavelength channel from the input optical port to the output optical port;
a plurality of optical components for providing optical coupling of the dispersive element to the input optical port, to the output optical port, and to the optical switching engine;
an optical bench for supporting the dispersive optical element and the plurality of optical components in a fixed relationship therebetween; and
an enclosure for packaging the optical switching engine and the optical bench having the optical elements mounted thereon, the enclosure having: a base for supporting the optical bench and the optical switching engine, a closed sidewall attached to the base, wherein the sidewall surrounds the optical bench and the optical switching engine, and a lid attached to the sidewall, for sealing the enclosure;
wherein at least a portion of the base comprises a ceramic board for supporting the optical switching engine,
wherein at least a portion of said ceramic board is mechanically accessible from both inside and outside of the enclosure, wherein said accessible portion of ceramic board has electrical feedthroughs coupled to said optical switching engine, and wherein said feedthroughs are mechanically and electrically accessible from the outside of the enclosure.

2. A reconfigurable optical add-drop module of claim 1, wherein the enclosure is a hermetically sealed enclosure.

3. A reconfigurable optical add-drop module of claim 2, wherein the optical switching engine comprises a MEMS array.

4. A reconfigurable optical add-drop module of claim 3, wherein the MEMS array is wirebonded to contact pads disposed on the ceramic board, wherein said contact pads are electrically coupled to the electrical feedthroughs in the ceramic board.

5. A reconfigurable optical add-drop module of claim 1, wherein the dispersive element comprises a diffraction grating.

6. A reconfigurable optical add-drop module of claim 1, wherein the ceramic board is smaller than the base.

7. A reconfigurable optical add-drop module of claim 1, wherein the ceramic board is the base.

8. A reconfigurable optical add-drop module of claim 7, wherein the ceramic board has a footprint, and wherein the sidewall has a footprint in a plane of the ceramic board's footprint, and wherein the footprint of the ceramic board is larger than the footprint of the sidewall, the reconfigurable optical add-drop module further comprising electronic components attached to the ceramic board outside of the footprint of the sidewall.

9. A reconfigurable optical add-drop module of claim 1, wherein the sidewall is made of Kovar.

10. A reconfigurable optical add-drop module of claim 1, wherein the optical bench is attached to the base with at least two posts having a polygonal cross-section.

11. A reconfigurable optical add-drop module of claim 1, wherein the ceramic board has a footprint at least 50 mm wide and at least 70 mm long.

12. A method of assembly of the reconfigurable optical add-drop module of claim 1, comprising:
(a) aligning the optical elements and the dispersive optical element to the optical bench;
(b) upon completion of step (a), fixing said optical and dispersive optical elements to the optical bench;
(c) attaching the base to the sidewall;
(d) attaching the optical switching engine to the ceramic board, and electrically coupling said optical switching engine to the feedthroughs in the ceramic board;
(e) upon completion of steps (b) and (d), aligning the optical bench to the optical switching engine, so as to provide the optical coupling between the optical switching engine on the ceramic board and the dispersive element on the optical bench;
(f) upon completion of step (e), attaching the optical bench to the base; and
(g) upon completion of step (f), attaching the lid to the sidewall, so as to seal the enclosure.

13. A method of assembly of claim 12, wherein in step (a), said aligning is performed by affixing a template to the optical bench, and by placing the optical elements and the dispersive optical element into the template.

14. A method of assembly of claim 13, wherein in step (b), said fixing is performed by epoxying the optical elements and the dispersive optical element to the optical bench.

15. A method of assembly of claim 12, wherein in step (c), said attaching is performed by soldering.

16. A method of assembly of claim 15, wherein said soldering is performed by using an AuSn alloy having melting temperature of 280+−40 C.

17. A method of assembly of claim 12, wherein in step (d), said electrical coupling is performed by wirebonding.

18. A method of assembly of claim 12, wherein in step (e), said aligning includes:
(h) bringing the optical bench to the optical switching engine;
(i) launching a test input optical signal into the input optical port, wherein the test input optical signal has a pre-determined optical power level;
(j) detecting a test output optical signal at the output optical port; and
(k) adjusting the position of the optical bench relative to the optical switching engine, so as to achieve a pre-defined optical power level of the test output optical signal.

19. A method of assembly of claim 12, wherein in step (f), said attaching is performed by using at least two posts having a polygonal cross-section, wherein each of said posts are attached to both the optical bench and the base.

20. A method of assembly of claim 12, wherein in step (g), said attaching is performed by welding or soldering.

* * * * *